United States Patent [19]
Leopold

[11] Patent Number: 5,528,693
[45] Date of Patent: Jun. 18, 1996

[54] METHOD AND APPARATUS FOR VOICE ENCRYPTION IN A COMMUNICATIONS SYSTEM

[75] Inventor: Raymond J. Leopold, Tempe, Ariz.

[73] Assignee: Motorola, Inc., Schaumburg, Ill.

[21] Appl. No.: 184,100

[22] Filed: Jan. 21, 1994

[51] Int. Cl.[6] ............................... H04L 9/02; H04L 7/00
[52] U.S. Cl. ........................... 380/48; 375/354; 375/356
[58] Field of Search .............................. 380/48; 375/106, 375/107, 354, 356

[56] References Cited

U.S. PATENT DOCUMENTS

| | | | |
|---|---|---|---|
| 4,754,482 | 6/1988 | Weiss | 380/48 |
| 4,856,063 | 8/1989 | McCalmont | 380/48 |
| 5,003,599 | 3/1991 | Landry | 380/48 |
| 5,278,907 | 1/1994 | Snyder et al. | 380/48 |
| 5,363,376 | 11/1994 | Chuang et al. | 375/107 |

*Primary Examiner*—Stephen C. Buczinski
*Attorney, Agent, or Firm*—Walter W. Nielsen; Gregory J. Gorrie

[57] ABSTRACT

A world-wide cellular radio telecommunications system utilizing low-earth orbit satellites provides secure transmissions of voice and data even though the length of the signal path of the communications link is dynamic. Crypto-algorithm generators at each end of a communications link are synchronized during a predetermined period of time after the initiation of communications. The crypto-algorithm generators are utilized to encrypt and decode, respectively, transmissions only after the expiration of the predetermined period of time.

15 Claims, 4 Drawing Sheets

METHOD AND APPARATUS FOR VOICE ENCRYPTION IN A COMMUNICATIONS SYSTEM

TECHNICAL FIELD

This invention relates generally to communications systems and, in particular, to a method and apparatus for voice encryption.

BACKGROUND OF THE INVENTION

The present invention has utility in providing secure voice communications in a communications system such as, but not limited to, a world-wide satellite cellular communications system. The need for fast, accurate, and cost-effective voice encryption is important in such a system, because many subscribers desire to maintain privacy and confidentiality in their communications.

Communications systems, such as cellular radio telecommunications systems and others, may include system-related components and populations of mobile units. The mobile units may freely move throughout the regions covered by the communications systems. The system components may include base units, repeaters, control stations, switching offices, and the like, and they are controlled by operators and providers of the communications systems. Members of the populations of mobile units may communicate with each other and perhaps with equipment coupled to the public switched telecommunications networks through the system components. The mobile units are typically controlled by customers or end users of the communications systems.

In mobile, digital, wireless communications at least two factors make it difficult to provide privacy. First, because the communications link is wireless, eavesdropping can be conducted by someone other than the desired recipient. Secondly, because the communications transceivers (i.e., subscriber units) are mobile and operate upon digital information, portions of data often become lost or mis-ordered in the transmission process.

Lost or mis-ordered data wreaks havoc with communications channels utilizing standard encryption schemes, especially if significant changes in the order of the data occur, or if much data is lost. Error-laden communications over channels which are susceptible to these problems can be corrected using standard error-correction or data-interleaving techniques, but these cause delays in the transmission. Transmission delays in the order of seconds, or tens of seconds, in personal voice communications are extremely annoying and are generally commercially unacceptable.

FIG. 1 shows a pictorial diagram of an environment within which a radio telecommunications system 10 operates. System 10 includes a constellation 12 of satellites 14 placed in relatively low orbits around the earth. In a preferred embodiment, the configuration of constellation 12 allows at least one of satellites 14 to be within view of each point on the surface of the earth at all times.

Due to their low earth orbits, satellites 14 constantly move relative to the earth. In a preferred embodiment, satellites 14 move in orbits at an altitude in the range of 500–1000 kilometers (km) above the earth. If, for example, satellites 14 are placed in orbits which are around 780 km above the earth, then an overhead satellite 14 travels at a speed of around 25,000 km/hr with respect to a point on the surface of the earth. Electromagnetic signals traveling at or near the speed of light between the surface of the earth and a satellite communications node 14 in such an orbit will require a propagation duration of 2–8 msec or more, depending on the satellite's angle of view. Moreover, electromagnetic signals traveling between the surface of the earth and a satellite 14 in such an orbit may experience a considerable Doppler component of frequency shift, the precise value of which is dependent on a source frequency and the satellite's angle of view.

System 10 additionally includes one or more switching offices (SOs) 16. SOs 16 reside on the surface of the earth and are in data communication with nearby ones of satellites 14 through RF communications links 18. Satellites 14 are also in data communication with one another through data communications links 20. Hence, through constellation 12 of satellites 14, an SO 16 may control communications delivered to any size region of the earth. However, the region controlled by each SO 16 is preferably associated with one or more specific geopolitical jurisdictions, such as one or more countries. SOs 16 couple to public switched telecommunications networks (PSTNs) 22, from which calls directed toward subscribers of system 10 may be received and to which calls placed by subscribers of system 10 may be sent.

System 10 also includes a population, with potentially millions of members, of mobile subscriber units 24. Mobile units 24 are configured to engage in communications with satellites 14 over portions of the electromagnetic spectrum that are allocated by governmental agencies associated with various geopolitical jurisdictions. Mobile units 24 communicate with nearby satellites 14 through communications links 26. System 10 accommodates the movement of mobile units 24 anywhere on or near the surface of the earth.

Any number of subscriber information managers (SIMs) 28 may also be included within system 10. Each SIM 28 may maintain a subscriber database that is relevant to only a discrete portion of the population of mobile units 24. The database may include information describing features associated with mobile units 24, rates to be associated with mobile units 24, current locations for mobile units 24, and the like. Each mobile unit 24 is assigned to one of SIMs 28, and that one SIM 28 is considered the "home" SIM 28 for the mobile unit 24. Each SO 16 may communicate with any SIM 28 through constellation 12, PSTN 22, or another communication path.

In general, system 10 is a network of nodes. Each mobile unit 24, satellite 14, SO 16, and SIM 28 represents a node of system 10. All nodes of system 10 are or may be in data communication with other nodes of system 10 through communications links 18, 20, and/or 26. In addition, all nodes of system 10 are or may be in data communication with other telephonic devices dispersed throughout the world through PSTNs 22. Furthermore, system 10 includes a control station 29 and mobile units 24. Mobile units 24 are controlled by the subscribers of system 10. Control station 29 includes the system components, including satellites 14, SOs 16, and SIMs 28. Control station 29 is controlled and operated by the providers of system 10. When a mobile unit 24 communicates with control station 29, the precise system components involved may be located anywhere in the world, and the communications are routed to the target components through communications links 18, 20, and/or 26. Any one of these or other system components alone or one or more of these or other system components collectively are referred to as control station 29 herein.

Communication services, including calls, may be set up between two mobile units 24 or between any mobile unit 24 and a PSTN phone number. Calls may be set up between any two locations on the earth, assuming appropriate licenses have been obtained in jurisdictions where the locations reside. Generally speaking, each mobile unit 24 engages in system communications with control station 29, and particularly a nearby SO 16, during call setup and during a registration process. The call setup communications take place prior to forming a communication path between a mobile unit 24 and another unit, which may be another mobile unit 24 or a PSTN phone number.

FIG. 2 shows a conceptual block diagram of a prior art voice encryption system in a terrestrial communications system which does not have dynamically allocatable nodes in the network, so which thus has fixed communications links. Information in the form of voice signals, for example, are detected by microphone 31 and processed by appropriate audio circuitry 34. The audio signal is then digitized by vocoder 37, and the digital signal is fed into modulo-two summer (an exclusive-OR combinational logic circuit) 50. A first crypto-algorithm generator 49 generates a unique binary sequence that is fed over line 40 to modulo-two summer 50, where it is mixed with the digital signal from vocoder 37 and output to transmitter or transceiver 51.

Transmitter 51 transmits the encrypted digital signal to receiver or transceiver 55 via any appropriate communications link 52, such as a radio-frequency link, cable, etc. The received encrypted digital signal is fed into modulo-two summer 74, which also receives the identical binary sequence from a second crypto-algorithm generator 69. Modulo-two summer 74 decodes the original digital signal, which is converted to an analog signal by digital/analog converter 77, processed by audio circuitry 80 and fed into speaker 83.

In order for modulo-two summer 74 to properly decode the original digital signal from the received encrypted digital signal, crypto-algorithm generator 69 must be synchronized with crypto-algorithm generator 49. Such synchronization is typically achieved via a separate synchronization link 58 coupling the two crypto-algorithm generators. However, it will be understood that rather than using two separate channels, one for the encrypted voice and one for the encrypted sync, both could be implemented on the same channel.

For the sake of simplicity of description, in FIG. 2 information is shown being transmitted from Tx 51 to Rx 55, but it should be understood that suitable additional circuitry would normally be provided in order for information to be transmitted in the opposite direction as well.

It will be appreciated that the signal path lengths of the communications link 52 and the synchronization link 58 of the prior art system shown in FIG. 2 are fixed. Thus the system depicted in FIG. 2 has a significant disadvantage when used in a communications system in which the signal paths may be changing.

For example, in a world-wide cellular communications system utilizing low-earth orbit (LEO) satellites, synchronization cannot be readily maintained between the crypto-algorithm generators due to the dynamic aspects of the communications links. This is because the link distances within the system are constantly changing –e.g., the distance between an individual subscriber unit (ISU) and a LEO satellite, the distance between a LEO satellite and a gateway, the distance between cross-link LEO satellites, etc.

Similar problems may be encountered with a terrestrial system in which the link distances within the system are changing –e.g., in a digital switched network having dynamic allocation of nodes.

Thus there is a significant need to provide voice and/or data encryption in a communications system having noisy communications channels that lose and mis-order bits, and wherein such encryption does not cause any significant transmission delay.

There is also a significant need within a communications system having dynamic signal path lengths, such as a world-wide cellular communications system utilizing LEO satellites, to provide an apparatus and method for fast, accurate, and cost-effective synchronization of the transmitting and receiving crypto-algorithm generators.

SUMMARY OF THE INVENTION

According to one aspect of the invention, a communications system comprises a source of digital signal information, a transmitter, a receiver, a communications link between the transmitter and receiver, a first crypto-algorithm generator coupled to the source for combining a crypto-algorithm with the digital signal information to provide an encrypted digital signal to the transmitter, a second crypto-algorithm generator coupled to the receiver for decoding the crypto-algorithm from the encrypted digital signal to provide the digital signal information, and a synchronization link between the first and second crypto-algorithm generators. The signal path lengths of the communications link and the synchronization link may be continuously changing. A method is provided for synchronizing the first and second crypto-algorithm generators, which method comprises the steps of: delaying the operation of the first and second crypto-algorithm generators for a predetermined period of time following initiation of the digital signal information from the source; utilizing the predetermined period of time to synchronize the first and second crypto-algorithm generators; and enabling the operation of the first and second crypto-algorithm generators after the predetermined period of time.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 1:
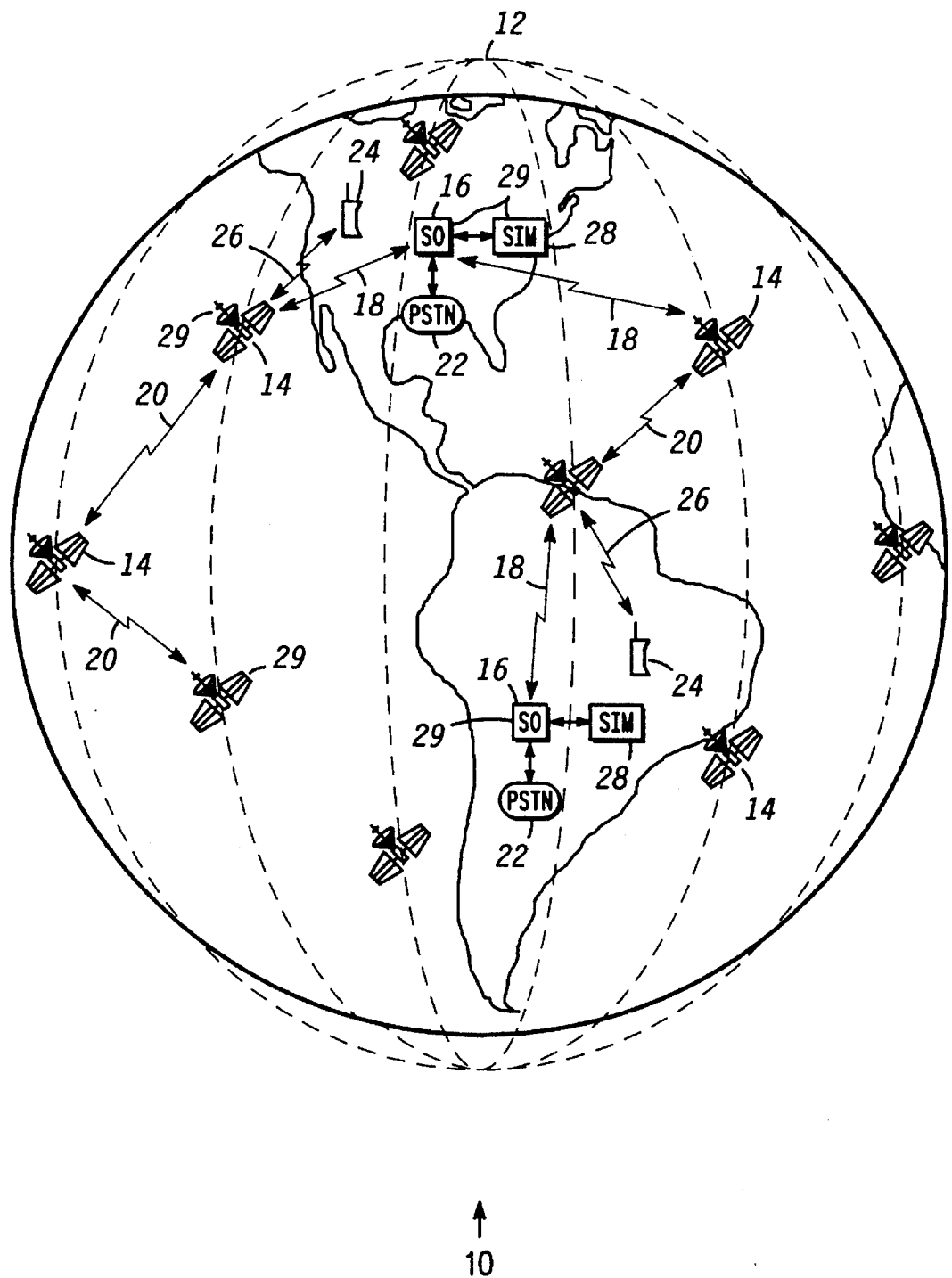
FIG. 1 shows a pictorial diagram of a world-wide cellular radio telecommunications environment within which a communications system utilizing voice encryption may operate.
Figure 2:
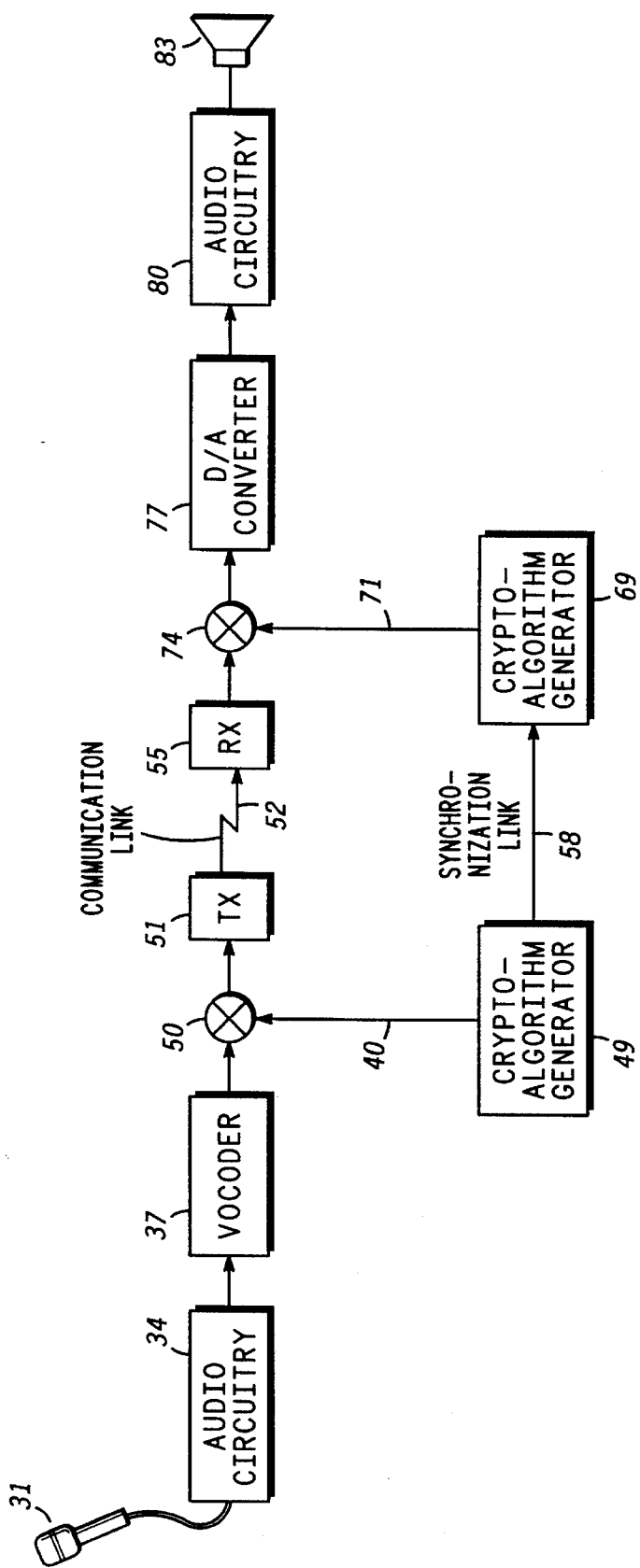
FIG. 2 shows a conceptual block diagram of a prior art voice encryption system in a communications system.
Figure 3:
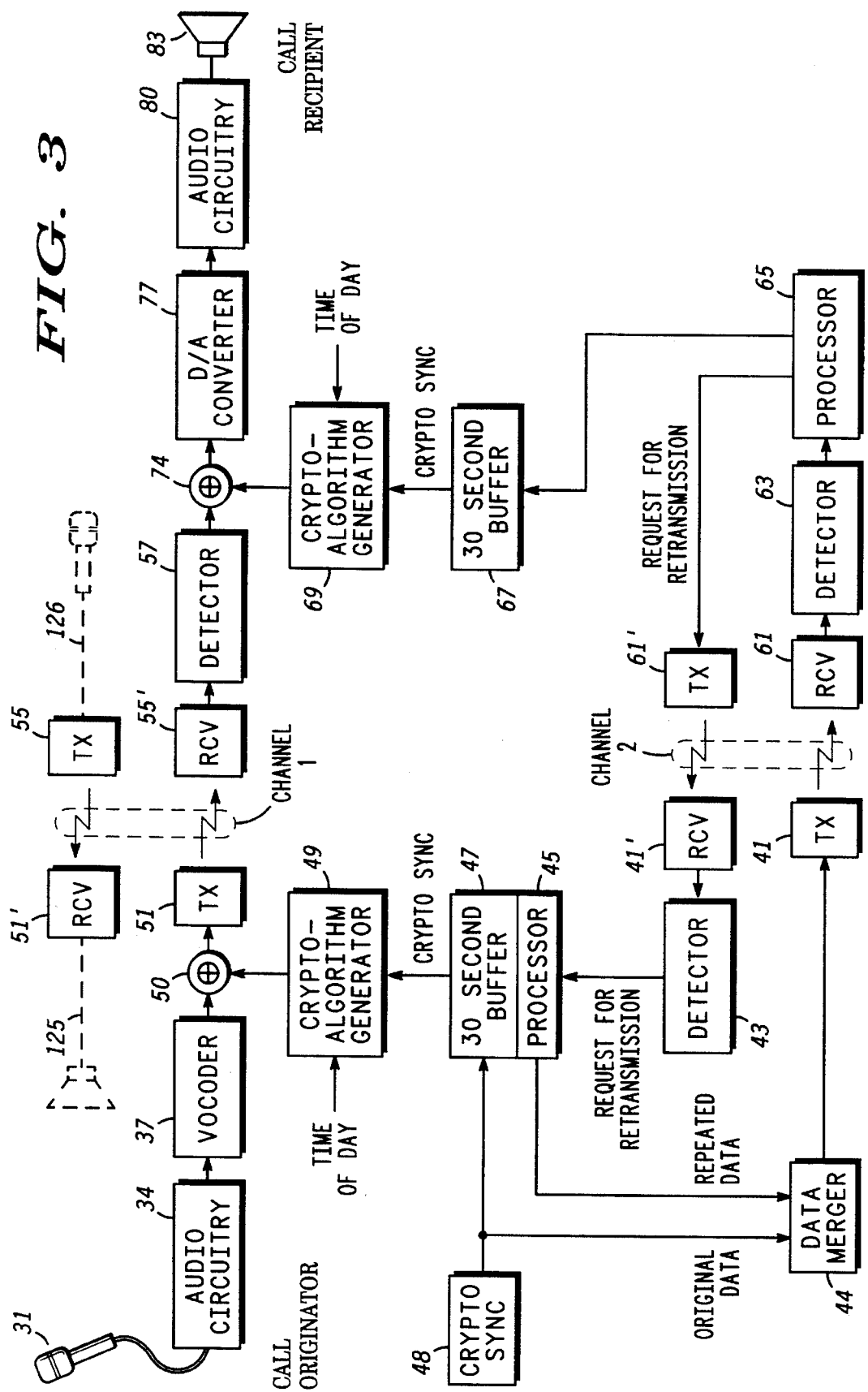
FIG. 3 shows a conceptual block diagram of a voice encryption system in a communications system in accordance with the present invention.

FIG. 3 shows a conceptual block diagram of a voice encryption system in a communications system in accordance with the present invention.

In general, information in the form of voice communications is generated on the left-hand side of FIG. 3 by a call originator. This information is transmitted over a communications channel (channel 1) and is received on the right-hand side by a call recipient. It will be understood that although, for the sake of simplicity of description in FIG. 3, information is shown being transmitted from transceiver 51, 51' to transceiver 55, 55', suitable additional circuitry, represented only by dashed lines 125 and 126, is provided in order for information to be transmitted in the opposite direction as well.

Voice signals, for example, are detected by microphone 31 and processed by appropriate audio circuitry 34. The audio signal is then digitized by vocoder 37, and the digital signal is fed as one input into modulo-two summer 50.

A crypto-sync generator 48 generates a crypto sync signal (in the form of a unique binary sequence) that is fed to delay means or buffer 47, as well as to data merger 44. The crypto sync signal is delayed for a sufficiently long time (e.g., 30 sec.) to allow any necessary retransmissions from the call originator that the call recipient may require. The circuitry in the call originator and in the call recipient will have to wait for at least the delay time before transferring encrypted information. It will be understood that the initial segment of voice transmission will be in the clear before encryption takes over.

From buffer 47 the crypto sync signal is sent to crypto-algorithm generator 49 whose output is framed similarly to the output of vocoder 37. These two digital signals are exclusive-OR'd bit-by-bit in modulo-two summer 50 to provide each frame that is transmitted by transceiver 51, 51'.

Transmitter 51 transmits the encrypted digital signal to receiver 55' via any appropriate communications link 51, such as a radio-frequency link, cable, etc. The received encrypted digital signal is fed into a data detector 57, which performs suitable error-detection and correction and frame-sequencing functions on the received signal.

The crypto sync signal that goes into data merger circuit 44 is combined with any repeated data being output by processor 45. Such repeated data represents any information that did not properly transmit to the call recipient during the transmission of earlier frames. The combination of both the crypto sync signal and the repeated data is sent to a transceiver, comprising transmitter 41 and receiver 41', which transmits it via channel 2 to a transceiver, comprising transmitter 61 and receiver 61'.

The received crypto sync signal is detected in detector 63 and sent to processor 65. Data processor 65 may request retransmission of any frames which are determined to be in error or missing from the transmission sequence. Data processor 65 also functions as a data corrector and may correct bits which it determines are erroneous.

Any request for retransmission is sent to transmitter 61, where it is transmitted over channel 2 to receiver 41'. The received request for retransmission is fed into detector 43 to data processor 45 associated with buffer 47, which thereupon sends the data to be retransmitted to data merger circuit 44, as described above.

Once data processor 65 determines that the received crypto sync signal is satisfactory, it sends it to delay means or buffer 67, which may be identical to buffer 47. From buffer 67 the received crypto sync signal is applied to crypto-algorithm generator 69, which may be identical to crypto-algorithm generator 49.

The output from crypto-algorithm generator 69 and from data detector 57 are exclusive-OR'd bit-by-bit in modulo-two summer 74 to provide a decoded digital voice output. This is converted to an analog voice signal by D/A converter 77. The analog voice signal is processed by audio circuitry 80 and fed into speaker 83.

It will be understood by one of ordinary skill in the art that detector 63, processor 65, and buffer 67 will typically be implemented as a dedicated signal processor.

It will also be understood that, once the call is set up between the call originator and the call recipient, that crypto-algorithm generators 49 and 69 may be used both for encoding and decoding. Alternatively, one can be used as a master and the other as a slave.

It will also be understood that crypto-algorithm generators 49 and 69 could also receive as inputs the time of day to improve the robustness of the encryption.

The amount of delay provided by delay means 47 and 67 may be adjusted in accordance with the maximum expected delay in receiving a corrected, transmitted signal within the communications system 10. For example, if the maximum expected delay between the time an encrypted signal is transmitted and the time it is received and corrected (if necessary) is 30 seconds, then delay means 47 and 67 are adjusted to provide a delay of at least 30 seconds for the crypto sync signal.

Waiting for at least this delay time assures that all frames have been put into the correct sequence, re-transmitted if missing, and appropriately error-corrected. It will be noted that, although certain frames of a voice signal may be received out of sequence or may be missing without unacceptably degrading the voice reception, the same is not true for the transmission of the crypto sync signal, which must be received (after any necessary correction) in its entirety and in the exact form as it was transmitted.

It will be understood that rather than using two separate channels, one for the encrypted voice and one for the encrypted sync, both could be implemented on the same channel.

Figure 4:
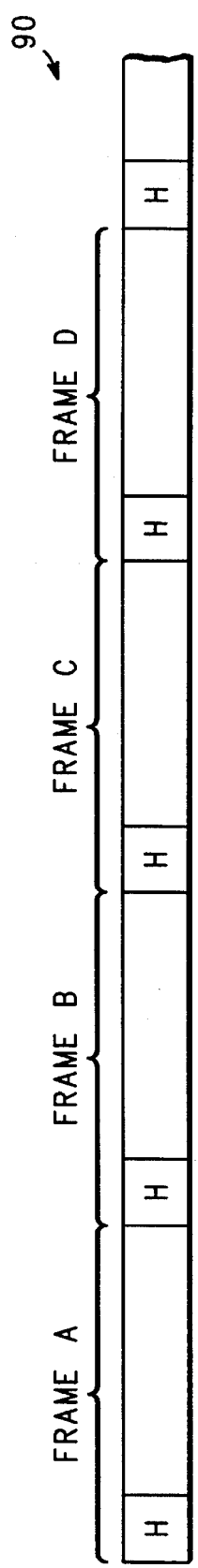
FIG. 4 shows the format of transmitted frames of information in a communications system in accordance with the present invention.

FIG. 4 shows the format of transmitted frames of information in a communications system in accordance with the present invention. A packet 90 of frames comprises frames A-D, each comprising a header H which comprises a short sequence number. The short sequence number may be, for example, an 8-bit number associated with each frame identifying its position within a certain length of time of transmissions –e.g., at a transmission rate of 10 frames/second, a 6-bit sequence code (generating 64 unique numbers) can handle 6.4 seconds of frame transmission time. As long as the dynamic range associated with the time delay through the communications network is less than 6.4 seconds, the 6-bit sequence code will be sufficiently long.

Following each header H, the balance of each frame may comprise information appropriately coded according to the desired transmission method.

Figure 5:
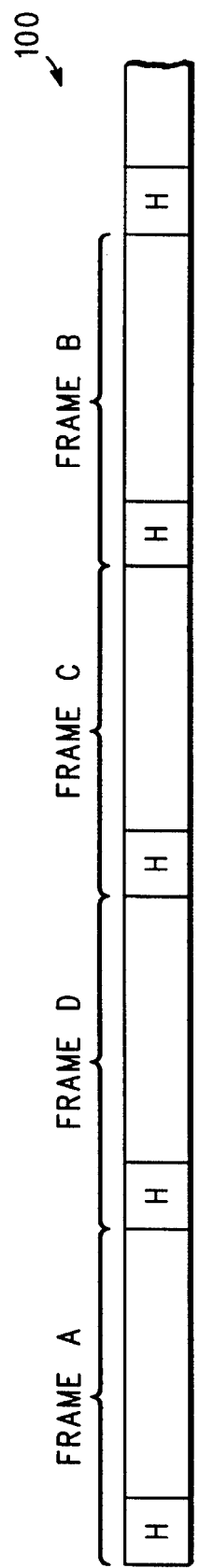
FIG. 5 shows the format of received frames of information in a communications system in accordance with the present invention.

FIG. 5 shows the format of received frames of information in a communications system in accordance with the present invention. As shown in FIG. 5, the frames received at the output of receiver 55 may be received out of sequence, because frame B follows frame C, and frames C and D are reversed. Data processor 65 corrects for missing bits and puts the frames back into the proper sequence. Data processor 65 may store each frame as it was received and check its sequence number. If a frame is missing, data processor 65 can request its re-transmission.

Operation of a Preferred Embodiment

With reference now to FIG. 3, the operation of the invention will be described.

During the set-up of a call utilizing the communications system, the exclusive-ORing of the source digital signal with the output of crypto-algorithm generator 49 by modulo-two summer 50 is delayed for a predetermined amount of time by delay means 47, and the exclusive-ORing of the received digital signal with the output of crypto-algorithm generator 69 by modulo-two summer 74 is delayed for the same amount of time by delay means 67. This is to allow sufficient time for the crypto sync signal received over channel 2 to be corrected, if necessary, at the call recipient's end. During this period of time, unencrypted voice or data is transmitted and received. Also during this period of time the crypto sync signal is transmitted over channel 2 but is not utilized at the call recipient's end until the predetermined delay has expired.

The system thus enables fast, accurate, and cost-effective synchronization of the transmitting and receiving crypto-algorithm generators in a communications system in which the signal paths may be constantly changing.

Conclusion

It will be appreciated that the present invention therefore provides an apparatus and method of voice encryption in a communications system which is significantly more reliable than existing voice encryption mechanisms.

Furthermore, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a communications system comprising
   a source of digital signal information,
   a transmitter, a receiver, a communications link between said transmitter and receiver, first and second crypto-algorithm generators for generating crypto-algorithms, said first crypto-algorithm generator also generating a crypto sync signal, a first modulo-two summer responsive to said source and to said first crypto-algorithm generator for combining a crypto-algorithm with said digital signal information to provide an encrypted digital signal to said transmitter,
   a first data corrector responsive to said receiver for correcting, if necessary, said encrypted digital signal,
   a second modulo-two summer responsive to said first data corrector and to said second crypto-algorithm generator for decoding said crypto-algorithm from said encrypted digital signal to provide said digital signal information,
   a first delay means located between said first crypto-algorithm generator and said first modulo-two summer for delaying the output of said first crypto-algorithm generator by a predetermined period of time,
   a synchronization link between said first and second crypto-algorithm generators, said synchronization link comprising
   a second data corrector responsive to said second crypto-algorithm generator for correcting, if necessary, said crypto sync signal, and
   a second delay means located between said second data corrector and said second crypto-algorithm generator for delaying the output of said second data corrector by said predetermined period of time,
   wherein the signal path lengths of said communications link and said synchronization link are continuously changing,
   a method for synchronizing said first and second crypto-algorithm generators, said method comprising the steps of:
   (a) said system delaying the operation of said first and second crypto-algorithm generators for said predetermined period of time following initiation of said digital signal information from said source;
   (b) said system utilizing said predetermined period of time to synchronize said first and second crypto-algorithm generators; and
   (c) said system enabling the operation of said first and second crypto-algorithm generators after said predetermined period of time.

2. The method recited in claim 1 wherein said first and second crypto-algorithm generators are each responsive to a time of day signal.

3. The method recited in claim 1 wherein said source of digital signal information is a digitized voice signal.

4. The method recited in claim 1 wherein said source of digital signal information is a digitized data signal.

5. In a communications system comprising
   a source of digital signal information,
   a first transceiver,
   a second transceiver,
   a communications link between said first and second transceivers,
   first and second crypto-algorithm generators for generating crypto-algorithms, said first crypto-algorithm generator also generating a crypto sync signal,
   a first modulo-two summer responsive to said source and to said first crypto-algorithm generator for combining a crypto-algorithm with said digital signal information to provide an encrypted digital signal to said first transceiver,
   a first data corrector responsive to said second transceiver for correcting, if necessary, said encrypted digital signal,
   a second modulo-two summer responsive to said first data corrector and to said second crypro-algorithm generator for decoding said crypto-algorithm from said encrypted digital signal to provide said digital signal information,
   a first delay means located between said first crypto-algorithm generator and said first modulo-two summer for delaying the output of said first crypto-algorithm generator by a predetermined period of time,
   a synchronization link between said first and second crypto-algorithm generators, said synchronization link comprising
   a second data corrector responsive to said second crypto-algorithm generator for correcting, if necessary, said crypto sync signal, and
   a second delay means located between said second data corrector and said second crypto-algorithm generator for delaying the output of said second data corrector by said predetermined period of time,
   wherein the signal path lengths of said communications link and said synchronization link are continuously changing,
   a method for synchronizing said first and second crypto-algorithm generators, said method comprising the steps of:

(a) said system delaying the operation of said first and second crypto-algorithm generators for said predetermined period of time following initiation of said digital signal information from said source;

(b) said system utilizing said predetermined period of time to synchronize said first and second crypto-algorithm generators; and (c) said system enabling the operation of said first and second crypto-algorithm generators after said predetermined period of time.

6. The method recited in claim 5 wherein said first and second crypto-algorithm generators are each responsive to a time of day signal, 7. The method recited in claim 5 wherein said source of digital signal information is a digitized voice signal, 8. The method recited in claim 5 wherein said source of digital signal information is a digitized data signal.

9. A method as claimed in claim 1 wherein said communications link and said synchronization link include a portion between a subscriber unit located on or near earth's surface and a satellite in low-earth orbit moving rapidly with respect to earth's surface resulting in a length of said portion of said communications link and said Synchronization link continually changing.

10. A subscriber unit for transmitting and receiving encrypted digital signals through a satellite communication system having communication satellites in non-geostationary orbit, said subscriber unit comprising a transmitter portion and a receiver portion, a) said transmitter portion comprising:

a source of digital signal information;

a transmit crypto-algorithm generator portion for generating crypto-algorithms;

a crypto sync signal generator for generating a crypto sync signal;

a transmit modulo-two summer responsive to said source and to said transmit crypto-algorithm generator portion for combining a crypto-algorithm with said digital signal information to provide an encrypted digital signal;

a transmitter for transmitting said encrypted digital signal over a communications link to said satellite communication system; and a transmit delay circuit for delaying the output of said transmit crypto-algorithm generator portion by a predetermined period of time, and b) said receiver portion comprising:

a first receiver portion for receiving encrypted digital signals over said communications link of said satellite communication system from said subscriber unit;

a receive crypto-algorithm generator portion for generating said crypto-algorithms;

a first data corrector responsive to said first receiver portion for correcting, if necessary, said received encrypted digital signal;

a receive modulo-two summer responsive to said first data corrector and to said receive crypro-algorithm generator portion for decoding said crypto-algorithm from said encrypted digital signal to provide said digital signal information;

a second receiver portion for receiving a crypto sync signal over a synchronization link;

a second data corrector responsive to said receive crypto-algorithm generator portion for correcting, if necessary, said received crypto sync signal; and a first delay circuit coupled between said second data corrector and said receive crypto-algorithm generator portion for delaying the output of said second data corrector by a predetermined period of time, said predetermined period of time based in part on a maximum expected delay associated with signal path length of said communications link, wherein the signal path lengths of said communications link and said synchronization link are continuously changing, the operation of said transmit crypto-algorithm generator portion or said receive crypto-algorithm generator portion is delayed for said predetermined period of time following initiation of said digital signal information from said source of digital signal information of a transmitting subscriber unit, said predetermined period of time is utilized to synchronize either said transmit or said receive crypto-algorithm generator portions with either a receive or a_ transmit crypto-algorithm generator of another subscriber unit, and the operation of either said transmit or receive crypto-algorithm generator portions is enabled after said predetermined period of time.

11. A subscriber unit as claimed in claim 10 further comprising:

a second receiver for receiving requests for retransmission of said crypto sync signal over said synchronization link;

a data merger for combining said crypto sync signal with repeated data; and a second transmitter for transmitting said crypto sync signal and said repeated data over said synchronization link.

12. A transmitting subscriber unit that transmits an encrypted digital signal to a receiving subscriber unit through a satellite communication system having communication satellites in non-geostationary orbit, said receiving subscriber unit including a first receiver portion for receiving an encrypted digital signal over a first communication link, a receive crypto-algorithm generator for generating crypto-algorithms, a first data corrector responsive to said first receiver portion for correcting, if necessary, said received encrypted digital signal, a receive modulo-two summer responsive to said first data corrector and to said receive crypto-algorithm generator for decoding said crypto-algorithms from said received encrypted digital signal to provide digital signal information, a second receiver for receiving a crypto sync signal over a synchronization link, a second data corrector responsive to said receive crypto-algorithm generator for correcting, if necessary, said crypto sync signal, a first delay circuit located between said second data corrector and said receive crypto-algorithm generator for delaying the output of said second data corrector by a predetermined period of time, said transmitting subscriber unit comprising:

a source of said digital signal information;

a transmit crypto-algorithm generator for generating said crypto-algorithms;

a crypto sync signal generator for generating said crypto sync signal;

a transmit modulo-two summer responsive to said source and to said transmit crypto-algorithm generator for combining said crypto-algorithms with said digital signal information to provide said transmitted encrypted digital signal;

a transmitter for transmitting said encrypted digital signal over a second communications link to said satellite communication system; and a first delay circuit for delaying the output of said transmit crypto-algorithm generator by a predetermined period of time, said predetermined period of time based in part on a maximum expected delay associated with a signal path length of said first and second communication links, wherein the signal path lengths of said first and second communications links and said synchronization link are continuously changing, the operation of said transmit and receive crypto-algorithm generators is delayed for said predetermined period of time following initiation of said digital signal information from said source, said predetermined period of time is utilized to synchronize said transmit and receive crypto-algorithm generators, and the operation of said transmit and receive crypto-algorithm generators is enabled after said predetermined period of time.

13. A transmitting subscriber unit as claimed in claim 12 further comprising:

a second receiver for receiving requests for retransmission of said crypto sync signal over said synchronization link;

a data merger for combining said crypto sync signal with repeated data; and a second transmitter for transmitting said crypto sync signal and said repeated data over said synchronization link.

14. A receiving subscriber unit for receiving an encrypted digital signal from a transmitting subscriber unit through a satellite communication system having communication satellites in non-geostationary orbit, said transmitting subscriber unit having a source of digital signal information, a transmit crypto-algorithm generator for generating crypto-algorithms, a crypto sync signal generator for generating a crypto sync signal, a transmit modulo-two summer responsive to said source and to said transmit crypto-algorithm generator for combining a crypto-algorithm with said digital signal information to provide said encrypted digital signal, a transmitter for transmitting said encrypted digital signal over a first communications link to said satellite communication system, a transmit delay circuit for delaying the output of said transmit crypto-algorithm generator by a predetermined period of time, said receiving subscriber unit comprising:

a first receiver portion for receiving said encrypted digital signal over a second communications link of said satellite communication system;

a receive crypto-algorithm generator for generating crypto-algorithms;

a first data corrector responsive to said first receiver portion for correcting, if necessary, said received encrypted digital signal;

a receive modulo-two summer responsive to said first data corrector and to said receive crypto-algorithm generator for decoding said crypto-algorithm from said encrypted digital signal to provide said digital signal information;

a second receiver portion for receiving said crypto sync signal over a synchronization link from said transmitting subscriber unit;

a second data corrector responsive to said receive crypto-algorithm generator for correcting, if necessary, said crypto sync signal; and a first delay circuit coupled between said second data corrector and said receive crypto-algorithm generator for delaying the output of said second data corrector by said predetermined period of time, said predetermined period of time based in part on a maximum expected delay associated with signal path lengths of said first and second communications links, wherein the signal path lengths of said first and second communications links and said synchronization link are continuously changing, the operation of said transmit crypto-algorithm generator and said receive crypto-algorithm generator is delayed for a predetermined period of time following initiation of said digital signal information from said source of digital signal information of said transmitting subscriber unit, said predetermined period of time is utilized to synchronize said transmit and receive crypto-algorithm generators, and the operation of said transmit and receive crypto-algorithm generators is enabled after said predetermined period of time.

15. A receiving subscriber unit as claimed in claim 14 further comprising:

a second receiver for receiving requests for retransmission of said crypto sync signal over said synchronization link;

a data merger for combining said crypto sync signal with repeated data; and a second transmitter for transmitting said crypto sync signal and said repeated data over said synchronization link.

* * * * *